No. 787,727. PATENTED APR. 18, 1905.
V. CHIAPPINELLI.
MACHINE FOR MAKING MACARONI.
APPLICATION FILED APR. 11, 1904.
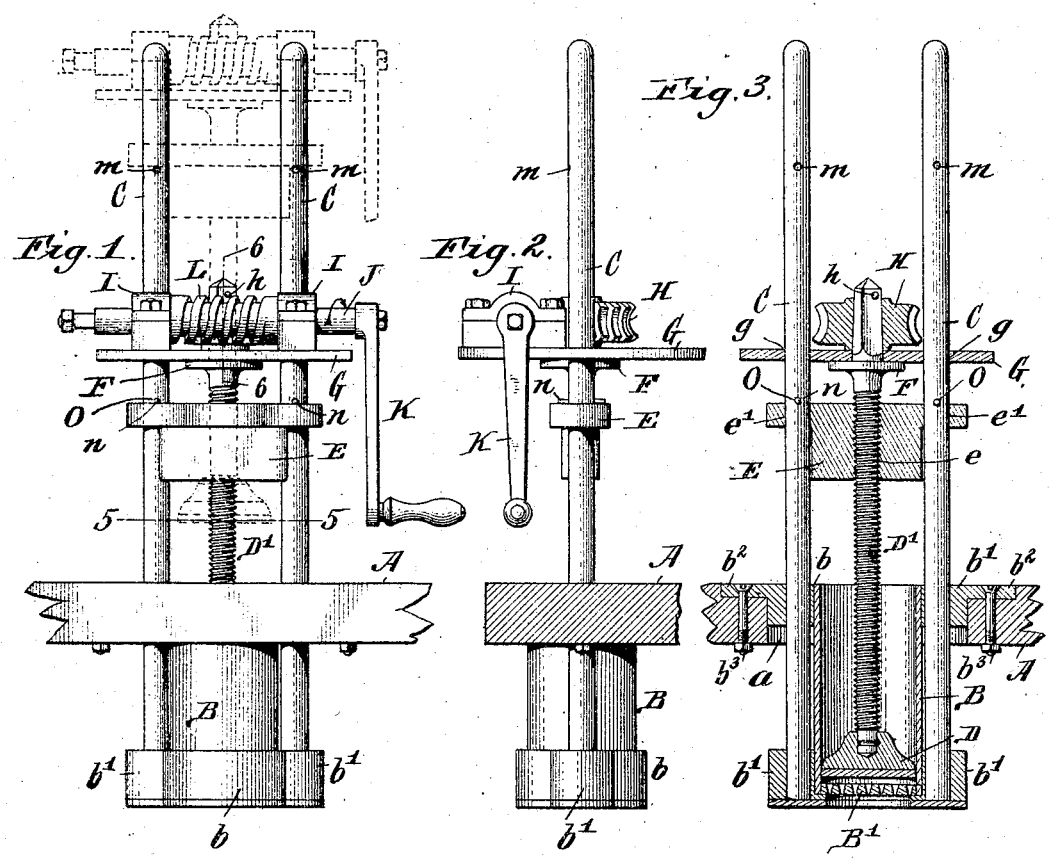
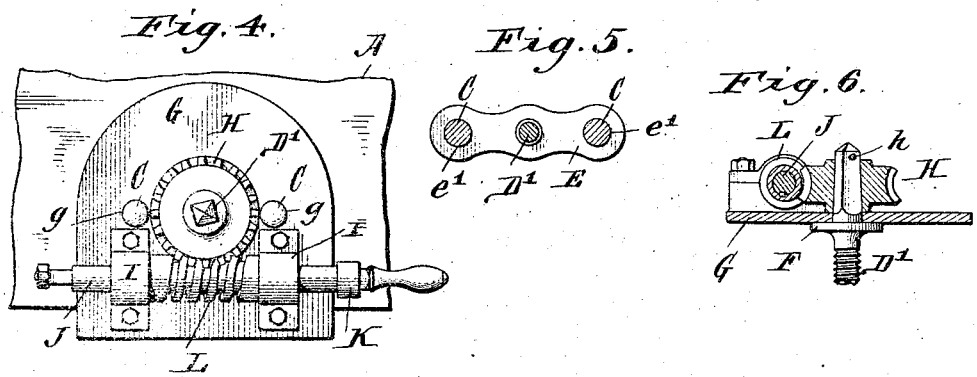
Witnesses:
Bert Wason
Edwin Maier
Vincenzo Chiappinelli, Inventor.
By Neukart & Burkhart
Attorneys.

No. 787,727.                                                    Patented April 18, 1905.

UNITED STATES PATENT OFFICE.

VINCENZO CHIAPPINELLI, OF BUFFALO, NEW YORK, ASSIGNOR OF ONE-THIRD TO SALVATORE PATERNO AND ONE-THIRD TO DOMENICO DOLCE, OF BUFFALO, NEW YORK.

MACHINE FOR MAKING MACARONI.

SPECIFICATION forming part of Letters Patent No. 787,727, dated April 18, 1905.

Application filed April 11, 1904. Serial No. 202,694.

*To all whom it may concern:*

Be it known that I, VINCENZO CHIAPPINELLI, a citizen of the United States, residing at Buffalo, in the county of Erie and State of New York, have invented new and useful Improvements in Machines for Making Macaroni, of which the following is a specification.

This invention relates to improvements in machines for making macaroni in which a suitable cylinder is employed to receive the macaroni dough and a screw-actuated plunger used in connection therewith to force the dough through the die held in the lower end of the cylinder.

The object of my invention is the production of a machine of this type in which means is provided to allow the plunger to be withdrawn from the cylinder after the dough is forced through the die thereof by unscrewing the plunger-screw until the lower face of the plunger is about even with the top of the cylinder, after which the plunger and its operating mechanism can be elevated with the cross-head by exerting upward pressure against the latter.

Other objects are to carry the operating mechanism on the plunger-screw, so as to cause the said mechanism to be raised and lowered with said screw, and to provide suitable guides on which the operating mechanism and connected parts are guided.

To these ends the invention consists in the construction, arrangement, and combination of parts to be hereinafter described, and particularly pointed out in the appended claims.

While referring to my invention as a macaroni-machine, I wish it to be understood that I do not confine myself to such machines, although the same is particularly designed for that purpose. The invention may also be used to good advantage in all cases where dough is pressed through a die—as, for instance, in machines for making noodles and in machines for molding Neufchâtel cheese, &c.

Referring to the accompanying drawings, Figure 1 is a front elevation of my improved machine. Fig. 2 is a side elevation of the same. Fig. 3 is a central vertical section of the machine. Fig. 4 is a top plan view of the same. Fig. 5 is a horizontal section on line 5 5, Fig. 1. Fig. 6 is a vertical section taken on line 6 6, Fig. 1.

A represents a part of a table or other support having an opening $a$, through which the lower portion of the machine projects.

B designates the cylinder forming the receptacle into which the macaroni dough is placed and having annular castings $b$ at its upper and lower ends, each of which is provided with extensions $b'$ at diametrically opposite points, into which cylindrical guide-rods C fit, that extend upward a considerable distance. The upper annular casting is provided with ears $b^2$, through which and the support A suitable securing-bolts $b^3$ are passed to securely fasten the machine to the support. The cylinder at its lower end is provided with a suitable die B', through which the macaroni dough is pressed by a plunger D, secured to the lower end of a plunger-screw D' in a manner to permit the latter to revolve without causing the plunger to revolve. The plunger-screw D' passes through a threaded opening $e$ in a cross-head E, which latter has openings $e'$ at opposite ends fitting the guide-rods C, thereby forming suitable means for guiding the cross-head on the said guide-rods. Near its upper end the plunger-screw is provided with a collar F, which carries a table or supporting-plate G, having guide-openings $g$, providing means for guiding the table or supporting-plate on the guide-rods. The upper extremity of the plunger-screw is preferably squared and has affixed thereto a worm-wheel H, a pin $h$ serving to hold the latter against accidental displacement.

The supporting-plate G is provided with two journal-boxes I, in which is journaled a transverse shaft J, having its ends projecting beyond the ends of the supporting-plate, so that a crank-handle K may be applied, thus rendering the same equally convenient for use by a person accustomed to using the left hand as by one accustomed to using the right hand. The said shaft is provided with a worm L, that is held in mesh with the worm-wheel H.

When it is desired to fill the receptacle with macaroni dough, the plunger and connected parts are elevated by unscrewing the plunger-screw D' until the lower face of the plunger is about even with the top of the receptacle, after which the plunger, operating mechanism, and cross-head are slid upward on the guide-rods to the position shown in dotted lines, Fig. 1, and are held in such position by pins inserted into apertures $m$ in the guide-rods, said pins supporting the cross-head directly, while the latter supports the operating mechanism. When the receptacle is supplied with dough, the pins are removed from the apertures $m$ and the cross-head and operating mechanism lowered until the plunger enters the receptacle and bears against the dough and the cross-head reaches a point beneath apertures O in the guide-rods, into which apertures stop-pins $n$ are held. Now on turning the operating-crank the plunger-screw is revolved through the intervention of the worm L and worm-wheel H, and the cross-head E, which tends to move upward on the guide-rods C, is held against such movement by the stop-pins $n$. By this arrangement the mechanism revolving the plunger-screw is raised and lowered with the latter and the entire operating mechanism and the cross-head can be raised and lowered on the guide-rods C at will, thus dispensing with the necessity of unscrewing the plunger-screw after the plunger is elevated to a point about even with the top of the dough-receptacle.

Having thus described my invention, what I claim is—

1. The combination of a cylinder having vertical guide-rods extending upwardly therefrom, a cross-head slidable on the guide-rods, means for holding said cross-head in different positions on the guide-rods, a plunger adapted for movement above and within the cylinder, a plunger-screw held to revolve in said cross-head, and operating mechanism for imparting movement to said plunger-screw, said operating mechanism being slidably mounted on said guide-rods so as to permit of elevating the same independent of or with the cross-head.

2. In a machine for making macaroni, &c., the combination of a cylinder having guide-rods extending from the upper end thereof, a cross-head movable on said guide-rods, a plunger, a plunger-screw carrying said plunger and being threaded into the cross-head for movement therein, and means for actuating said plunger-screw, said means being movable on the guide-rods independent of or with the cross-head.

3. In a machine for making macaroni, &c., the combination of a cylinder having guide-rods, a cross-head guided for movement on said guide-rods, a plunger adapted for movement above and within said cylinder, a plunger-screw carrying said plunger and being threaded into the cross-head for movement therein, means for actuating said plunger, said means being guided on the guide-rods so as to be elevated and lowered independent of the cross-head by force of gravity and by an upward thrust exerted thereagainst, and means for holding said actuating means at certain points on the guide-rods.

4. In a machine for making macaroni, &c., the combination of a cylinder having guide-rods extending from the upper end thereof, a cross-head guided for movement on said guide-rod and having a threaded opening in line with the axis of said cylinder, a plunger, a plunger-screw having said plunger secured to the lower end thereof and being threaded into the threaded opening in said cross-head, a transverse shaft journaled and supported to raise and lower with said plunger-screw at all times, and operative connection between said transverse shaft and the plunger-screw.

5. In a machine for making macaroni, &c., the combination of a cylinder having vertical guide-rods secured thereto at diametrically opposite points, a cross-head having a threaded opening and being supported on said guide-rods and capable of vertical movement thereon, a plunger, a plunger-screw secured to said plunger and passing through the threaded opening in said cross-head, a supporting-plate carried on said plunger-screw and being guided on the guide-rods, so as to move with or independent of the cross-head, a worm-wheel secured to the plunger-screw, a worm meshing with said worm-wheel and being journaled on said supporting-plate, and means for revolving said worm.

6. In a machine for making macaroni, &c., the combination with the cylinder, and guides extending upward therefrom and having each an aperture near its upper end and a second aperture at a suitable point below said first-mentioned aperture, of a cross-head slidable on said guide-rods, means carried by the cross-head for pressing the contents of the cylinder, pins fitting the first-mentioned apertures for holding the cross-head and supported parts elevated, and pins fitting the second-mentioned apertures and serving to hold the cross-head against movement when pressing the contents of the cylinder.

7. In a machine for making macaroni, &c., the combination with the cylinder and guide-rods extending upward therefrom, of a cross-head supported on said guide-rods, a plunger-screw threaded for movement in said cross-head, and a horizontal shaft movable toward and from the cross-head and having operative connection with the plunger-screw.

8. In a machine for making macaroni, &c., the combination with the cylinder and guide-rods extending upward therefrom, of a cross-head supported on said guide-rods, a plunger-screw having a collar near its upper extremity, a plunger at the lower end of said screw, a supporting-plate resting on said collar and being guided on said guide-rods, and a horizontal shaft journaled on said supporting-plate and having operative connection with the plunger-screw to revolve the same.

In testimony whereof I have affixed my signature in the presence of two subscribing witnesses.

VINCENZO CHIAPPINELLI.

Witnesses:
HOMER E. DUDLEY,
SYLVANUS B. NYE.